United States Patent [19]
Millard et al.

[11] 3,871,469
[45] Mar. 18, 1975

[54] STEERING MECHANISMS
[75] Inventors: Barry J. Millard; Leslie R. Jenvey, both of Reading, England
[73] Assignee: Adwest Engineering Limited, Reading, England
[22] Filed: Nov. 6, 1973
[21] Appl. No.: 413,396

[30] Foreign Application Priority Data
Oct. 20, 1972 United Kingdom............... 48407/72

[52] U.S. Cl.................... 180/79.2 R, 92/75, 280/96
[51] Int. Cl............................ B62d 3/12, B62d 5/10
[58] Field of Search................. 180/79, 2 R; 280/96; 92/75

[56] References Cited
UNITED STATES PATENTS
3,151,533  10/1964  Hartel................................. 92/75 X
3,486,576  12/1969  Breon et al. .................... 180/79.2 R
3,756,340  9/1974   Millard........................... 180/79.2 R Primary Examiner—David Schonberg
Assistant Examiner—J. A. Pekar
Attorney, Agent, or Firm—Larson, Taylor & Hinds

[57] ABSTRACT

A rack-and-pinion steering mechanism for a road vehicle having two sets of steerable road wheels, and including a rack, a pinion, and two pistons which are separable in a cylinder to lock the steering linkages to one set of wheels in the straight ahead position while allowing the rack to move freely when a steering wheel of the vehicle is manipulated. The pistons can be retracted during movement of the vehicle to allow steering of the one set of wheels.

5 Claims, 2 Drawing Figures

STEERING MECHANISMS

BACKGROUND OF THE INVENTION

This invention is concerned with improvements in or relating to steering mechanisms and is especially concerned with a rack-and-pinion steering mechanism for a steerable set of wheels of a motor vehicle having two sets thereof.

Hitherto, it has become very well known to provide two sets of steerable wheels on motor vehicles such as lorries and public transport vehicles, the two sets of wheels being positioned in close proximity adjacent a forward end of the vehicle and one or more fixed sets of wheels being provided adjacent the rear end of the vehicle. Additionally it has also been proposed to provide the facility of steering the rear set of wheels of a four-wheel vehicle.

Although the provision of steering for the second set of wheels does or can provide a high degree of manoeuvrability at low speeds in comparison with that achieved with steering applied to only one set of wheels, steering on two sets of wheels at high speed is undesirable. With a typical conventionally steered system, the steering box is mounted close to the forward end of the vehicle chassis and is connected via a drag link to the wheel lever of the first set of wheels, these being paired together with a tie rod. A second drag link connects to a slave lever pivoted on the chassis close to a double spring eye connection and from this connection a further link connects to the wheel lever of the second set of wheels again paired together with a tie rod. It will be readily understood that spring and lost motion in this complex linkage system together with inaccuracies of motion can cause the set of steered wheels remote from the steering gear to go "out of phase" with the forward set resulting in oscillation and instability of steering particularly at speed. It is necessary to steer the second set of wheels to prevent heavy tyre scrub and poor turning circle at low speeds but this condition is not applicable in straight high speed running on main roads or motorways for which it is more desirable that the second set of wheels are locked in the straight ahead position.

OBJECT OF THE INVENTION

It is an object of the present invention to provide a steering mechanism for a second steerable set of wheels of a motor vehicle having two sets thereof whereby the second set of wheels can be locked in the straight ahead position for high speed running of the vehicle.

SUMMARY OF THE INVENTION

The present invention provides a rack-and-pinion steering mechanism suitable for a steerable set of wheels of a motor vehicle having two sets thereof, the mechanism comprising a housing a pinion rotatably mounted in the housing and connected for rotation directly or indirectly by the steering control of a motor vehicle, when the mechanism is installed in the motor vehicle, a rack slidably mounted in the housing in meshing engagement with wht pinion and arranged to be connected to the steerable set of wheels to impart steering thereto, and means whereby said steerable set of wheels can be locked if desired, when the mechanism is in use, in the normal straight ahead position, while maintaining meshing engagement between the rack and the pinion.

The means whereby the second steerable set of wheels can be locked preferably comprises piston means slidable in the housing, which provides a cylinder therefor, the piston means being mounted at each end of the rack so as to be movable therewith during normal operation of the mechanism when in use, and being movable under fluid pressure away from the rack to hold steering linkages to the second set of wheels in their straight ahead positions when the means is operated to lock the second set of wheels as aforesaid. With the pistons so moved away from the rack, the rack is free to move under the influence of rotation of the pinion and thus when the lock is removed from the second set of wheels, these wheels can be immediately aligned with the first set of wheels.

It will be appreciated that a vehicle equipped with a mechanism according to the invention could, whenever necessary — for example in the event of a punctured front tyre when the vehicle is running at high speed- unlock and steer the second set of wheels to regain steering ability, locking of the second set of wheels prior to such a puncture having assisted in maintaining a straight course at speed on, for example, a motorway or other highway.

The present invention is also useful in so far as it can be used to perform solely as a rigid connection between the steered wheels and a vehicle chassis and is applicable to all types of vehicle and suspension. It could also be used for steering trailer type vehicles or connected vehicles of the train type. It will also be appreciated that valve control mechanism can be coupled to the mechanism to operate as a normal rack-and-pinion steering mechanism should the need arise whereby the vehicle required locked steered wheels or was under the control of a manual steering gear. It is foreseen that this mechanism may be used in conjunction with a power assisted steering gear of conventional type and especially with a companion rack-and-pinion steering mechanism such as that disclosed in the complete specification of U.K. Pat. No. 1,241,428.

BRIEF DESCRIPTION OF THE DRAWINGS

There now follows a detailed description which is to be read with reference to the accompanying drawings of a rack and pinion steering mechanism according to the invention; it is to be clearly understood that this mechanism has been selected for description to illustrate the invention by way of example and not by way of limitation.

In the drawings:-

DESCRIPTION OF SPECIFIC EMBODIMENT

Figure 1:
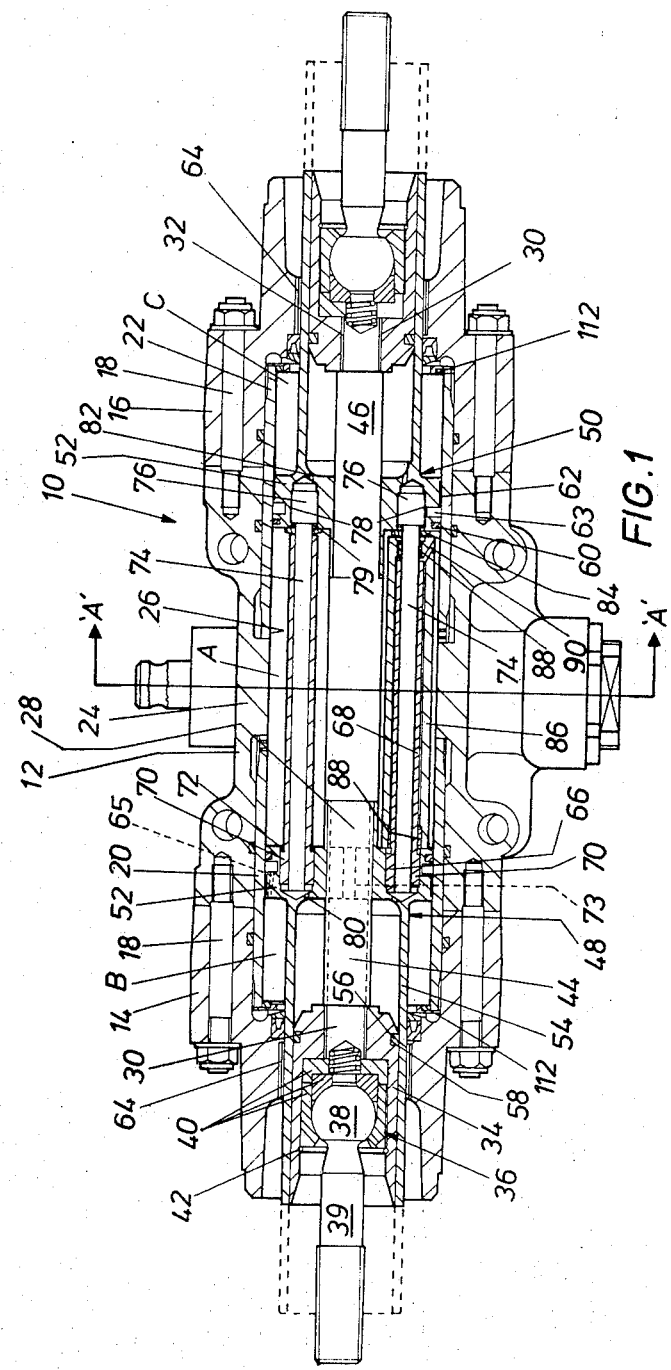
FIG. 1 is a longitudinal sectional view of a rack-and-pinion steering mechanism according to the invention.
Figure 2:
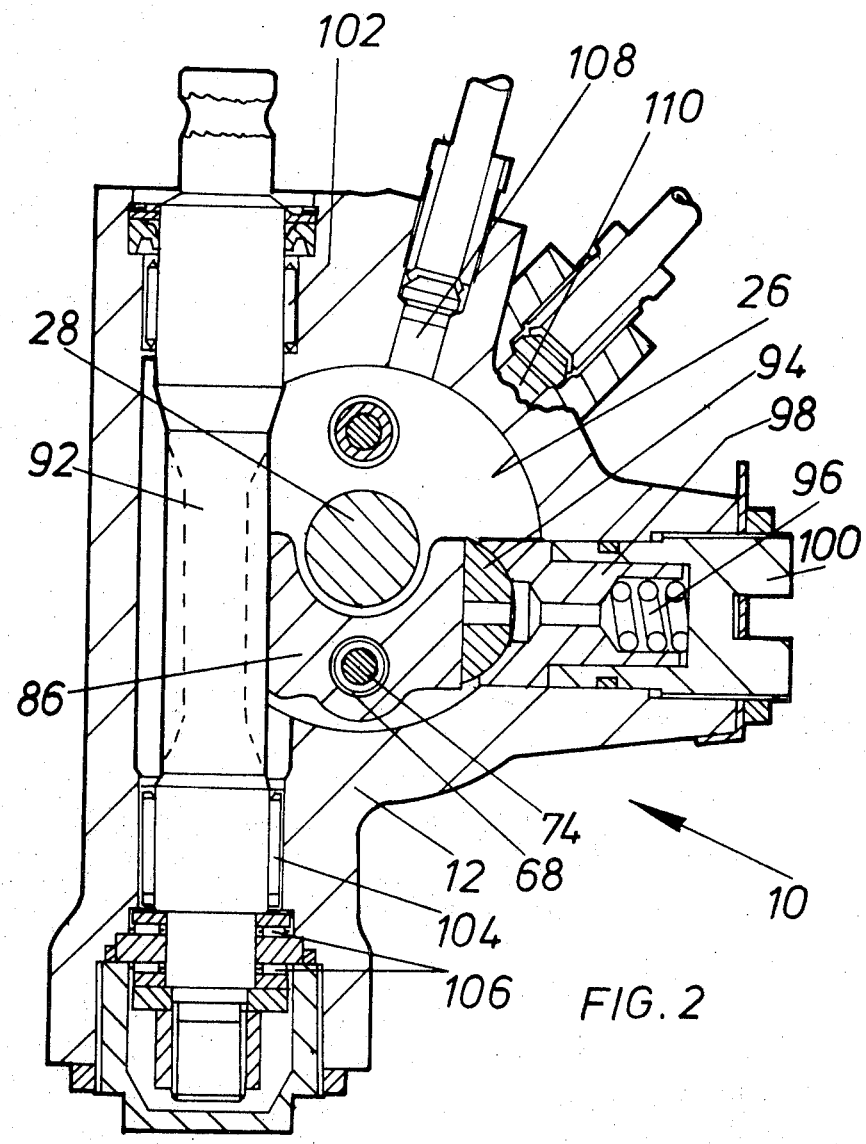
FIG. 2 is a cross-sectional view of the mechanism taken on the line A—A of FIG. 1.

The mechanism shown in the drawings comprises a housing indicated by the general reference 10, the housing being a three part housing consisting of a central part 12 and end parts 14 and 16 which are secured to the central part 12 by bolts 18. The housing 10 provides a hollow chamber in which are provided two cylindrical sleeves 20 and 22, inner surfaces of which together with an internal annular portion 24 of the central part 12 of the housing define a cylinder 26 of constant radius.

Mounted co-axially in the cylinder 26 is an elongate cylindrical link member 28 which is threaded at each end portion 30, the threaded end portions being threadedly engaged in threaded bores 32 provided in cylindrical adaptor pieces 34 which house ball-and-socket joints 36 each comprising a ball 38, and a three part socket 40 retained in threaded engagement in the respective adaptor piece. A lock ring 42 prevents unthreading of the socket from the adaptor. The ball 38 has an extension 39 for connection to a steering linkage of a motor vehicle. The member 28 and the adaptor pieces form a rigid assembly.

The member 28 is splined lengthwise from each end to a point approximately one-third along its length, and mounted for sliding movement on the splined portions 44,46 of the member 28 are pistons indicated by the general references 48,50, which pistons divide the cylinder 26 into three chambers A,B and C. Each piston 48, 50 comprises a piston head 52, which has a splined central bore co-operating with the respective splined portion 44,46 of the member 28, and an integrally-formed hollow cylindrical piston rod 54 which is of an internal diameter such as to accommodate the respective adaptor piece 34 for sliding movement therein. A sealing ring 56 is provided in an annular recess 58 formed in each adaptor piece for sealing against the interior surface of the respective piston rod 54, and similarly piston and bearing rings 60 and 62 provided in annular recesses formed in the piston head 52 of each piston 48, 50 for sealing against the internal surfaces of the cylinder 26. Also formed in the piston head between the piston and bearing rings 60 and 62 is an annular recess 63 which provides an oilway connected by bores 65 to the cylinder 26 for the purpose of connecting with a pressure cut-off facility as each respective piston approaches its full inward travel condition as described in the complete specification of our U.K. Patent No. 1,241,248. The piston rod 54 of each piston 48, 50 is supported in bearings 64 in the end parts 14 and 16 of the housing 10.

Machined into the piston head 52 of the piston 48 are two blind bores 66 into which are press-fitted head portions 70 of two hollow guide rods 68 the head portions 70 being restrained from inadvertent movement out of the blind bores by circlips 72. Passages 73 are provided in the piston heads for allowing fluid to flow through the piston heads when the pistons are slidably moved. Slidably mounted in the hollow rods 68 are two solid rods 74 each having a head portion 76 which is press-fitted in a blind bore 78 formed in the piston head 52 of the piston 50, and retained therein by a circlip 79. Each blind bore 66, 78 is in communication through a passage 80, 82 respectively with the interior of the respective hollow piston rod 54 to allow expulsion of air and oil from the hollow interior of the guide rods 68 and the bores when the rods 74 are pressed into the rods 68 and to allow oil to be drawn into the hollow rods when the rods 68 and 70 are extended.

To prevent undue rattle in use and to absorb any tolerances, disc springs 84 are fitted on the rods 74 between the end face of each hollow rod 68 and the face of the head 52 of the piston 50.

Mounted for sliding movement on the lower hollow rod 68 and the rod 74 is a toothed rack 86 which is machined at each end thereof to accept an annular bush 88 supporting the rack for movement relative to the rod 68 and 74. A passage 90 is provided in the rack between the interior thereof and the cylinder 26 to allow for oil intake from and expulsion into the cylinder.

The rack 86 is pivotable on the rods 68 and 74 to maintain proper engagement of the rack with a pinion 92 of the rack-and pinion mechanism as described in U.S. Pat. No. 3,756,340 to Millard. The rack 86 is maintained in constant engagement with the pinion by a spring-urged pad 94 acting on the rack 86, the spring 96 being housed in a sleeve 98 providing a seat for the pad and itself being slidably held in position by a threaded bush 100 threaded in the housing part 12, between which bush and the sleeve 98 the spring 96 acts.

The pinion is mounted in bearings 102, 104, and 106 in the central housing part and can be connected by its uppermost portion through a rack-and-pinion arrangement or by any other suitable means with the pinion of a steering mechanism as described in the aforesaid U.S. Patent from which the pinion 92 is driven in sychronisation therewith.

Fluid connections are provided to the three parts of the cylinder 26 formed by the piston heads 52. The fluid connection to the central part of the cylinder (i.e. between the piston heads) is provided by a port 108 and the connection to the right-hand part (viewing FIG.1) is provided by a port 110, that port to the left-hand part of the cylinder is not shown in the drawings. Each fluid connection is a fluid flow-and-return line which connects, when the mechanism is in use, the respective part of the cylinder through suitable valve arrangements with a pump or accumulator, or a fluid reservoir, in parallel with the fluid connections to the other steering mechanism by which the mechanism according to the invention is operated.

During normal operation of the mechanism according to the invention when incorporated in a vehicle travelling at slow speed, hydraulic fluid is admitted to both end parts and the central part of the cylinder 26 whilst the vehicle is moving in a straight line but when the vehicle is steered, fluid under pressure is admitted to one or other of the end parts of the cylinder and expelled from the other to urge the pistons, in association with movement of the rack by the piston to turn the wheels of the set controlled by the mechanism.

To lock the wheels in the straight ahead position for high speed travel of the vehicle, fluid under pressure is admitted to the central part of the cylinder through the port 108. The pressure of fluid in the central part of the cylinder forces the pistons 48 and 50 outwardly (i.e. away from the pinion 92) to the positions indicated in dotted outline. The piston rods slide over the extension 39, which movement is acceptable when no vehicle suspension movement is involved. However, if it is necessary to accommodate suspension movement, the adaptor pieces 34 can be positioned to allow such movement.

When the pistons 48 and 50 reach the limit of their movement, they are urged against static seals 112 of elastomeric material. The use of static seals as opposed to dynamic seals prevents leakage of fluid and so increases the effectiveness of the pump or accumulator providing the fluid pressure. In their limit positions, the pistons hold the adaptor pieces 34 in positions such that the wheels controlled by the steering linkages, to which the extensions 39 are linked, are fixed in the straight ahead position.

Movement of the pistons 48 and 50 causes extension of the telescopically-mounted rods 68 and 74, thereby allowing the rack 86 which is no longer entrained between the piston heads to move freely on the rods while maintained in correct enagement with the pinion 92, ready to resume steering of the wheels associated therewith when the lock thereon, provided by the pressure acting on the pistons 48 and 50, is released.

If required an additional mechanical locking means can be provided. In the event of failure of the power steering system with subsequent necessity to manually steer two sets of wheels which requires considerable physical effort, the wheels controlled by the mechanism according to the invention, can be locked so that only one set of wheels is steered thereby reducing the required effort.

We claim:

1. In a rack-and-pinion steering mechanism suitable for steering one set of steerable road wheels of a motor vehicle having two such sets, an elongate housing, a pinion rotatably mounted in the housing and connectable with the steering control of a motor vehicle for rotation thereby, a link member extending longitudinally of the housing, the link member being movable longitudinally relative to the housing and the opposite ends of the link member being connectable to a set of steerable road wheels for imparting steering thereto, a toothed rack in constant mesh with said pinion and mounted for longitudinal sliding movement in said housing, and selectively operable means for selectively connecting the toothed rack to said link member so that longitudinal movement imparted to the toothed rack by rotation of said pinion will be transmitted to the link member or locking the link member in a centralized position and freeing the toothed rack for longitudinal movement relative to the link member while maintaining meshing engagement between the rack and the pinion.

2. Apparatus as claimed in claim 1 wherein said elongate housing defines a cylinder, and wherein said selectively operable means comprises spaced pistons slidable in said cylinder and mounted on opposite ends of the said link member for limited sliding movement relative thereto, said pistons being movable between first positions wherein they engage opposite ends of said toothed rack and connect the toothed rack to said link member so that longitudinal movement imparted to the toothed rack by rotation of said pinion will be transmitted to the link member and second positions wherein they engage end portions of the housing to lock the link member in a centralized position and free the toothed rack for longitudinal movement relative to the link member.

3. A rack-and-pinion steering mechanism according to claim 2 wherein means in provided for supplying fluid under pressure to opposite ends of said cylinder for moving said pistons to said first position, and wherein means is provided for supplying fluid under pressure to said cylinder between said pistons for moving said pistons to said second position.

4. A rack-and-pinion steering mechanism according to claim 2 wherein said pistons are interconnected by two diametrically opposed telescopic rod members, said rack being mounted for sliding movement on one of said rod members.

5. A rack-and-pinion steering mechanism according to claim 2 wherein each said piston comprises a hollow piston rod and wherein said link member has at each end thereof an adaptor whereby it is connectable to said one set of steerable road wheels, each said adaptor being slidably accommodated within a said hollow piston rod.

* * * * *